United States Patent [19]

van der Lely et al.

[11] 4,127,074
[45] Nov. 28, 1978

[54] SOIL CULTIVATING IMPLEMENT

[75] Inventors: Ary van der Lely, Maasland; Cornelis J. G. Bom, Rozenburg, both of Netherlands

[73] Assignee: C. van der Lely N.V., Maasland, Netherlands

[21] Appl. No.: 771,120

[22] Filed: Feb. 23, 1977

[30] Foreign Application Priority Data

Feb. 25, 1976 [NL] Netherlands ............... 7601915

[51] Int. Cl.² .............................................. A01C 5/00
[52] U.S. Cl. .................................... 111/85; 172/112
[58] Field of Search .............................. 111/85, 6-7, 111/10; 172/60, 112

[56] References Cited

U.S. PATENT DOCUMENTS

| 3,146,740 | 9/1964 | Phillips | 111/7 |
| 3,563,191 | 2/1971 | Yovanovich | 111/10 |
| 3,625,167 | 12/1971 | van der Lely | 172/112 X |
| 3,791,322 | 2/1974 | van der Lely et al. | 111/7 |
| 3,995,570 | 12/1976 | van der Lely | 111/85 |

FOREIGN PATENT DOCUMENTS

| 2,040,010 | 3/1971 | Fed. Rep. of Germany | 111/7 |
| 2,212,940 | 10/1972 | Fed. Rep. of Germany | 172/112 |
| 2,402,759 | 7/1975 | Fed. Rep. of Germany | 111/7 |
| 1,359,491 | 7/1974 | United Kingdom | 111/7 |

Primary Examiner—Robert E. Bagwill
Attorney, Agent, or Firm—Mason, Mason & Albright

[57] ABSTRACT

An agricultural implement has a driven rotor with cultivator blades and a hood that overlies the rotor. The hood extends down to the rear and the lower hood portion is a guide that has a row of teeth. The teeth are extensions that furrow the worked soil and each tooth corresponds to a material delivery duct that communicates material, such as seeds, from a hopper to the furrows. A ground engaging trough-like levelling member is adjustably connected to side plates of the hood and the openings of the ducts are positioned near the levelling member to prevent clogging of the openings. One or more rear rollers are arranged behind the levelling member with driving connections to a rotatable mechanism in the hopper.

20 Claims, 4 Drawing Figures

SOIL CULTIVATING IMPLEMENT

Figure 1:
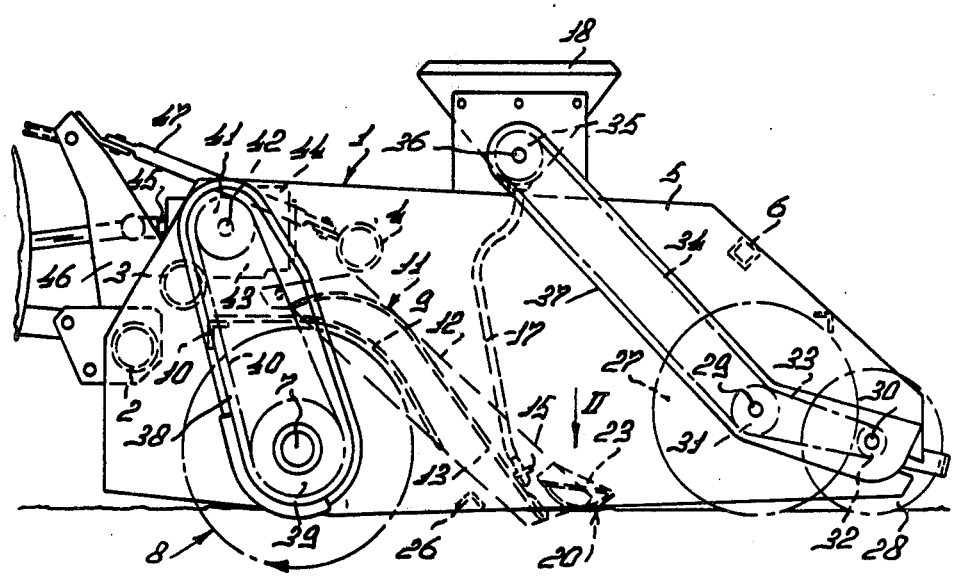
Figure 2:
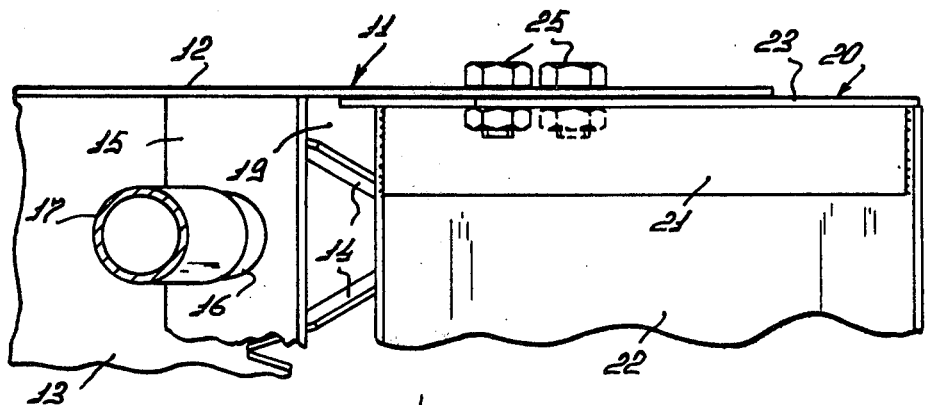
Figure 3:
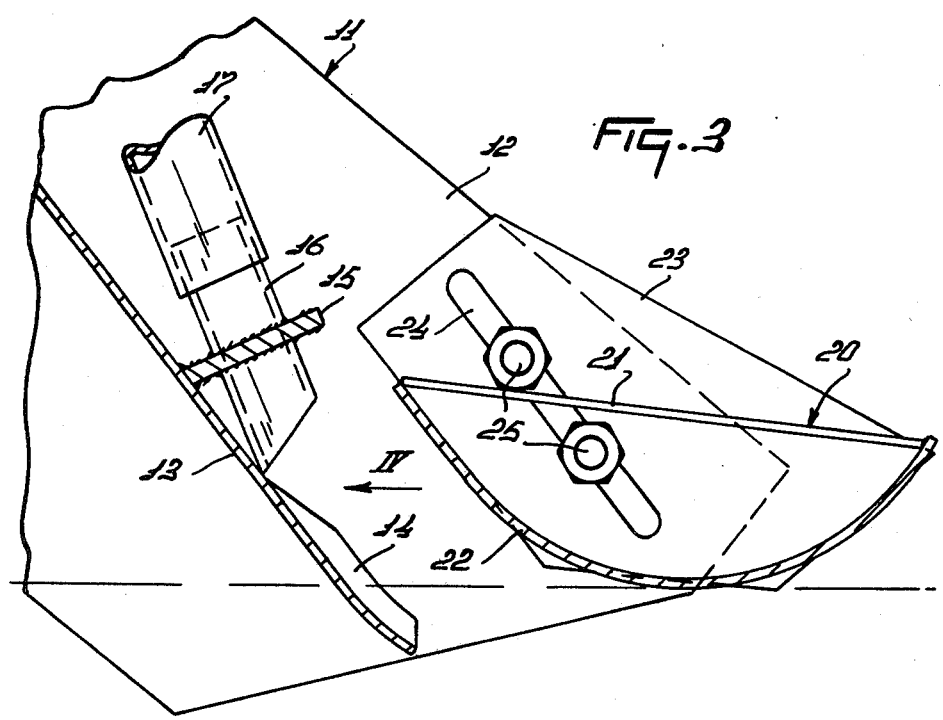
Figure 4:
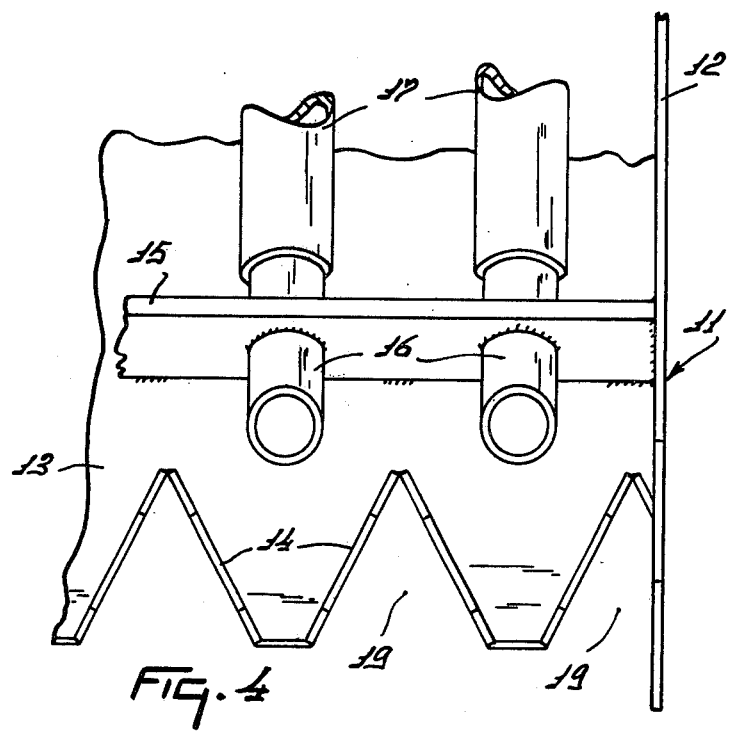

FIG. 1 is a somewhat diagrammatic side elevation of a soil cultivating implement in accordance with the invention connected to the rear of an agricultural tractor, FIG. 2 is a part-secional plan view, to an enlarged scale, as seen in the direction indicated by an arrow II in FIG. 1, and illustrates the construction and arrangement of members at one side of the implement in greater detail, FIG. 3 is an elevation as seen in the direction indicated by an arrow III in FIG. 2, and FIG. 4 is an elevation as seen in the direction indicated by an arrow IV in FIG. 3.

Referring to the accompanying drawings, the soil cultivating implement or cultivator that is illustrated therein comprises a frame 1 which includes, towards the front thereof with respect to the intended direction of operative travel of the cultivator, three parallel frame beams 2, 3 and 4 that are all substantially horizontally disposed in substantially perpendicular, or at least transverse, relationship with said direction of travel, the latter being from right to left as seen in FIGS. 1, 2 and 3 of the drawings. The three frame beams 2, 3 and 4 are located one behind the other with respect to the intended direction of operative travel and are also at successively higher levels above the ground surface. The ends of the three beams 2, 3 and 4 are interconnected by corresponding substantially vertical, or at least upwardly extending, side plates 5, said side plates 5 both being substantially parallel to the intended direction of operative travel. Rear portions of the two side plates 5 are interconnected by a frame beam 6 that extends parallel or substantially parallel to the frame beams 2, 3 and 4. Each side plate 5 has upper and lower edges that are parallel or substantially parallel to one another, the opposite front and rear ends of the upper edge making junctions with downwardly and forwardly, and downwardly and rearwadly, respectively, inclined edge portions. The downwardly inclined rear edge portion of each plate 5 is longer than is the corresponding downwardly inclined edge portion at the front of the plate.

Substantially horizontally aligned bearings carried by the two side plates 5 by rotatably support a shaft 7 which extends substantially horizontally between them, said shaft 7 being located at a level which is a short distance above that of the lower edges of the two side plates 5 and at a position of advance with respect to the intended direction of operative travel of the implement which is such that, when the implement is seen in plan view, said shaft is located between the frame beams 3 and 4 and somewhat closer to the beam 4 than it is to the beam 3. The shaft 7 is the central shaft of a soil working rotor 8 which comprises a plurality of soil working members whose constructions and arrangements are not illustrated since they are not relevant to the present invention. The intended direction of operative rotation of the rotor 8 is indicated by an arrow in FIG. 1 of the drawings and it will be seen that said direction is such that the soil working members of the rotor 8 move forwardly through the soil with respect to the direction in which the implement as a whole moves over the ground when it is in use. Upper and upper rear regions of the rotor 8 are partially surrounded by rods 9 with at least part of each rod 9 being bent around the rotor 8 in such a way that its center of curvature is coincident or substantially coincident with the axis of rotation of the central shaft of said rotor. The leading ends of the rods 9 with respect to the intended direction of operative travel of the implement are fastened to a bar 10 of L-shaped cross-section which bar interconnects the side plates 5 of the frame 1, said rods 9 being spaced apart from one another at short but regular intervals along the transverse length of the bar 10 with the center line of each partially curved rod 9 contained in a substantially vertical plane that is parallel or substantially parallel to the intended direction of operative travel of the implement. A screening hood or baffle 11 is mounted between the two side plates 5 of the frame 1 so as to be pivotable about an axis that is substantially parallel to the axis of rotation of the shaft 7 and that is located substantially vertically thereabove. The leading edge of the hood or baffle 11 is located close to the axis of its pivotal mounting and it extends rearwardly, with respect to the intended direction of operative travel of the implement, from that edge through a cylindrically curved portion which, in one angular position of the hood or baffle 11 about its pivotal mounting, has its axis of curvature in substantially coincident relationship with the axis of rotation of the shaft 7. The rear of the cylindrically curved portion merges into a flat portion which, as can be seen in FIG. 1 of the drawings, is in downwardly and rearwardly inclined relationship to the intended direction of operative travel of the implement from its top towards its bottom. The opposite lateral edges of the hood or baffle 11 are secured to corresponding substantially rectangular plates 12 that are in substantially parallel relationship with the closely adjacent side plates 5 of the frame 1.

The flat planar portion of the hood or baffle 11 is formed, towards its lowermost and rearmost edge, with a plurality of extensions that are in the form of truncated substantially triangular teeth 13 (see particularly FIG. 4). Each tooth 13 is, towards its lowermost extremity, curved rearwardly to a small extent with respect to the intended direction of operative travel of the implement (see particularly FIG. 3). The edges of the teeth 13 are provided with upwardly extending parts in the form of rims 14 which extend down to the junctions of those edges with the linear (i.e. non-pointed) terminal edges of the successive teeth and upwardly as far as the pointed junctions of the edges of the successive teeth which bear said rims with the remaining untoothed part of the flat portion of said hood or baffle 11. FIGS. 2, 3 and 4 of the drawings make it clear that the lower ends of the rims 14 are steeply bevelled and that their upper ends are also bevelled, but much less steeply.

The substantially rectangular plates 12 at the opposite edges of the hood or baffle 11 are interconnected, at a short distance above the teeth 13, by a support strip 15 through which support strip, at regular intervals which correspond to the spacing between the teeth 13, are rigidly entered tubular delivery members 16 which have open delivery ends arranged in substantial register with the upper root ends of the successive teeth 13. Each tubular delivery member 16 communicates, by way of a corresponding flexible delivery duct 17, with the bottom of a container in the form of a hopper 18 for material that is to be supplied onto and/or into the soil by the implement immediately after its cultivating action. The hopper 18 could, purely for example, contain seed that are to be shown in rows that extend parallel to the intended direction of operative travel of the implement but it is emphasised that materials other than, or in addition to, seeds could equally well be supplied onto and/or into the soil by the implement. The flexible delivery ducts could, if preferred, be wholly or partly replaced by telescopically interconnected tubular members and said ducts 17 or the like and the hopper 18 afford parts of a mechanism for supplying material onto and/or into the soil. As will be evident from FIG. 1 of the drawings, the hopper 18 has mounting plates which connect it to the upper edges of the side plates 5, said hopper 18 extending throughout the width of the implement between its side plates 5. The teeth 13 form parts of a guide member that is generally indicated by the reference 19 and which guide member is arranged to co-operate with the seeds or other material fed to the tubular delivery members 16 during the operation of the implement. The guide member 19 comprises the whole lower toothed region of the substantially flat portion of the hood or baffle 11.

Lower rearmost portions of the substantially rectangular plates 12 of the hood or baffle 11 support the opposite ends of a trough-shaped levelling member 20 which member 20 extends substantially horizontally parallel to the beams 2, 3 and 4 throughout the working width of the implement. As can be seen in FIG. 3 of the drawings, the member 20 has a lower ground-engaging portion 22 which is of cylindrically curved configuration except at its leading extremity where it is flattened. The flattened part of the lower ground-engaging portion 22 is in parallel or substantially parallel relationship with the guide member 19 that is spaced forwardly therefrom by a short distance and acts as a screen for the open lowermost ends of the tubular delivery members 16. It will be evident from FIGS. 1 and 3 of the drawings that the leading edge of the lower ground-engaging portion 22 of the member 20 is at a higher horizontal level than is the rear edge thereof, said higher level being one which, in the illustrated position, is just above that of the open ends of the delivery members 16. Said open ends are behind the guide member 19 with respect to the intended direction of operative travel of the implement and are located principally above the teeth 13 of that guide member. The opposite ends of the trough-shaped levelling member 20 carry flat strips 21 at the top of the ground-engaging portion 22 thereof, said strips 21 being fastened to substantially vertically disposed plates 23 whose lower edges approximately, but not exactly, match the curvature of the portion 22 (see FIG. 3). Actually, the plates 23 have relatively inclined straight edges which form obtuse angular portions which, as seen in FIG. 3, project outwardly beyond the convex lower surface of the ground-engaging portion 22. One point of each plate 23 is directed generally forwardly with respect to the intended direction of operative travel of the implement while the other point of the same plate is orientated generally rearwardly relative to that direction. Each of the substantially rectangular plates 12 is formed, in register with the corresponding plate 23, with a straight slot 24 whose length is parallel or substantially parallel to the general plane of the guide member 19. Each plate 23 is formed with a pair of spaced holes and corresponding pairs of bolts 25 are entered through those holes and through the co-operating slots 24. The trough-shaped levelling member 20 can thus be adjusted in position relative to the substantially rectangular plates 12 in a direction that is parallel to the lengths of the slots 24, any chosen position, such as the one that is illustrated in the drawings, being maintained, as long as is desired, by tightening the bolts 25. It will be appreciated that, since the slots 24 extend substantially parallel to the general plane of the guide member 19, only the level of the member 20 relative to said guide member 19 will be changed by the adjustment that has just been described and not the attitude of said member 20 to either the guide member 19 or the horizontal.

A ground scraper 26 (FIG. 1) interconnects the lower edges of the side plates 5 of the frame 1 at a location that is immediately in front of the guide member 19 with respect to the intended direction of operative travel of the implement, said ground scraper 26 being in the form of a bar of V-shaped cross-section arranged with the point of the "V" uppermost and its limbs diverging downwardly therefrom. Central shafts 29 and 30 of corresponding rollers 27 and 28 are rotatably supported by rear regions of the two side plates 5 in such a way that the longitudinal axes (axes of rotation) of said shafts 29 and 30 are substantially horizontally parallel to one another and to the axis of rotation of the rotor 8 with the shaft 29 in advance of the shaft 30 relative to the intended direction of operative travel of the implement. In fact, although not illustrated in detail in the drawings, each of the two rollers 27 and 28 is afforded principally by a plurality of circular or generally circular discs that are spaced apart from one another at regular intervals along the shaft 29 or 30 concerned. The discs of the leading roller 27 are of larger diameter that are those of the rear roller 28 and the regular arrangement of said discs lengthwise of the respective shafts 29 and 30 is such that, as can be seen in FIG. 1 of the drawings, said discs lie alternately one between the other in an overlapping relationship which has a significant extent in the intended direction of operative travel of the implement. Corresponding ends of the central shafts 29 and 30 of the two rollers 27 and 28 are provided, just beyond the outer surface of the same side plate 5, with sprocket wheels 31 and 32 around which wheels a transmission chain 33 is drivingly arranged. It will be seen from FIG. 1 of the drawings that the sprocket wheel 31 is of larger effective diameter that is the sprocket wheel 32 but it is noted that the ratio between the sizes of the two sprocket wheel 31 and 32 is the same as is the ratio between the diameters of the two rollers 27 and 28 so that, during operation of the implement, the two rollers, drivingly interconnected by the chain 33, will revolve without slippage. The sprocket wheel 31 is a double sprocket wheel and the second set of teeth thereof are drivingly connected by a transmission chain 34 to a sprocket wheel 35 at one end of a central shaft 36 forming part of a flow control or dosing member (not illustrated) that extends inside the hopper 18 to govern the rate at which seeds or other material is fed to the upper ends of the flexible delivery ducts 17 or the like. The sprocket wheels 31, 32 and 35, the projecting ends of the shafts 29, 30 and 36 that carry them and the transmission chains 33 and 34 are all surrounded by a protective casing 37.

One end of the central shaft 7 of the rotor 8 projects beyond the outer surface of the corresponding frame side plate 5 into a protective chain casing 38 and carries, inside that chain casing, a sprocket wheel 39 which is preferably of multiple construction. A transmission chain 40, which is preferably also of multiple construction, places said sprocket wheel 39 in driven connection with a further sprocket wheel 41 that will also be of multiple construction if a similar construction is used for the sprocket wheel 39 and chain 40. The sprocket wheel 41 is secured to the end of a substantially horizontal shaft 42 which projects into the casing 38 close to the top of the latter. The substantially horizontal shaft 42 extends substantially perpendicular, or at least transverse, to the intended direction of operative travel of the implement and its opposite end is rotatably journalled in a gear box 43 which is rigidly supported on the frame 1 at a location between the two side plates 5 thereof. A bevel pinion and shaft transmission (not vissible) within the gear box 43 places the shaft 42 in driven connection with a rotary input shaft 45 whose leading splined or otherwise keyed end, with respect to the intended direction of operative travel of the implement, projects forwardly from the front of said gear box 43 substantially in said direction of travel. The aforementioned transmission by which the shaft 42 is in driven communication with the rotary input shaft 45 includes a change-speed gear 44 that is mounted at the back of the gear box 43 with respect to the intended direction of operative travel of the implement. It is not necessary to describe nor to illustrate the change-speed gear 44 in detail for the purposes of the present invention and it suffices to say that said change-speed gear 44 enables any chosen one of a number of different transmission ratios to be adopted between the rotary input shaft 45 of the gear box 43 and the shaft 42 which indirectly drives the rotor 8.

The frame beams 2 and 3 that are at the front of the frame 1 with respect to the intended direction of operative travel of the implement are provided, at a location which is midway, or substantially midway, between the general planes of the two side plates 5, with a coupling member or trestle 46 that is constructed and arranged to enable the frame 1 of the implement to be connected to the three-point lifting device or hitch of an agricultural tractor or other operating vehicle. Downwardly and rearwardly divergent tie rods 47 rigidly interconnect substantially the top of the coupling member or trestle 46 and horizontally spaced apart points on the frame beam 4.

In the use of the soil cultivating implement or cultivator that has been described, its coupling member or trestle 46 is connected to the three-point lifting device or hitch at the rear of an agricultural tractor or other operating vehicle in a manner which is generally known per se and which can be seen, in outline, in FIG. 1 of the drawings. The rotary input shaft 45 of the gear box 43 is placed in driven connection with the power take-off shaft at the rear of the same tractor or other operating vehicle by way of an intermediate telescopic transmission shaft, which is of a construction that is known per se, having universal joints at its opposite ends. Part of said transmission shaft can be seen in FIG. 1 of the drawings. If required, the speed at which the rotor 8 will be driven in response to a more or less constant input speed of rotation applied to the shaft 5 will be adjusted by manipulation of the change-speed gear 44 before work commences. Such adjustment will be made having regard to the nature and condition of the soil that is to be cultivated and to the nature and requirement of the seeds and/or other material that is/are to be supplied thereto immediately behind the rotor 8. Adjustment of the position of the trough-shaped levelling member 20 relative to the plates 12 of the hood or baffle 11 may also be necessary before cultivation commences. As the implement moves operatively over the ground from right to left as seen in FIG. 1 of the drawings, the rotor 8 is driven to revolve in the previously discussed direction which is indicated by an arrow in FIG. 1 so that its soil working members displace earth upwardly in front of the shaft 7 and rearwardly over the top of that shaft towards the rods 9. As previously discussed, the rods 9 are quite closely spaced apart from one another throughout the working width of the implement so that finely divided soil can pass between them towards the hood or baffle 11 whereas stones, hard lumps of soil turfs and so on are too large to go through the gaps and therefore slide downwardly along said rods 9 to fall into the broad furrow or channel excavated by the rotor 8. The finely divided soil which has passed between the rods 9 is guided downwardly towards the ground by the unperforated hood or baffle 11 and falls back into said broad furrow or channel on top of the stones, hard soil lumps, turfs and so on thus effectively burying the same.

It will be remembered that the hood or baffle 11 is pivotable relative to the frame 1 about a substantially horizontal axis that is parallel to the axis of rotation of the rotor 8 and that is located substantially vertically above the latter. The hood or baffle 11 thus bears against the ground surface, behind the rotor 8 and the ground scraper 26, by way of the region thereof that affords the guide member 19 for the seeds or other material that reaches the tubular delivery members 16 from the hopper 18. Lowermost edge regions of the two substantially rectangular plates 12 at the opposite sides of the hood or baffle 11 define downwardly directed points of obtusely angled configuration and these points cut grooves in the loose soil which has already been displaced by the rotor 8. The seeds or other material fed at a controlled rate, which is proportional to the speed at which the implement makes forward progress over the ground, from the hopper 18 to the tubular delivery members 16 fall from said members 16 onto the rear surface of the guide member 19 and are guided downwardly towards the non-pointed terminal edges of the teeth 13 by the downwardly convergent rims 14 of said teeth 13. It will, of course, be realised that said teeth 13 form furrows in the loose soil during forward progress of the implement, the displaced soil being ridged, to some extent, in lines that register with the gaps between the successive teeth 13. Thus, the material from the delivery members 16 is delivered accurately to the bottom of the furrows that are formed by the teeth 13, the ridges of soil from said furrows being flattened out to re-fill them by the immediately following trough-shaped levelling member 20. As previously discussed, the level of the member 20 relative to that of the hood or baffle 11 can be changed by loosening the bolts 25, moving said member 20 upwardly or downwardly along the slots 24 and retightening the bolts 25 to maintain the new position. It will be apparent that raising of the levelling member 20 will reduce its levelling effect while lowering thereof will augment the levelling action. The front flattened part of the lower ground-engaging portion 22 of the levelling member 20 screens the open delivery ends of the tubular member 16 from direct contact with the soil which could cause them to become clogged. It will be realised that such clogging could occur when the implement is in contact with the ground and moved rearwardly with respect to its intended direction of operative travel. Such rearward movement can occur during manoeuvring and often also occurs, to a limited extent, at the commencement of a cultivating peration as a result of the direction in which the rotor 8 revolves.

The flow control or dosing mechanism inside the hopper 18 is driven from the ground by the drivingly interconnected roller 27 and 28 and its speed of operation is thus directly related to the speed of forward travel of the implement. The discs of the rollers 27 and 28 ensure that the cultivated soil, that is seeded and/or supplied with other material from the hopper 18, is gently compressed to an adequate extent, their compressing action being additional to that of the levelling member 20. The ground scraper 26 ensures that the surface of the soil worked by the rotor 8 is substantially flat immediately before it is subject to the furrowing and ridging action of the following guide member 19. The implement that has been described is effective in cultivating a strip of soil to bring it into a condition in which it is ready to receive seeds and of concurrently sowing the seeds at a controlled rate, said seeds being covered with the worked soil to an adequate extent, the construction and operation of the implement being such that, in particular, blockage of the open ends of the tubular delivery members for the seeds or other material by cultivated soil is almost always avoided or is very markedly reduced as compared with known implements that are not constructed in accordance with the present invention.

In the implement that has been described, its soil working or cultivating members are carried by the shaft 7 and form parts of the soil working rotor 8 that revolves about a horizontal or substantially horizontal axis. However, it is pointed out that this is not an essential feature of the invention and that the primary cultivating action of the implement could equally well be effected by soil working or cultivating members that are rotatable about substantially vertical, or at least upwardly extending, axes. In such a case, a plurality of rotary soil working or cultivating members would be provided to work individual strips of soil that overlap one another throughout the width of the implement so that, in effect, a single broad strip of worked soil would be produced in advance of the tubular delivery members 16.

Although various features of the soil cultivating implement or cultivator that have been described and/or that are illustrated in the accompanying drawings will be set forth in the following claims as inventive features, it is emphasised that the invention is not necesarrily limited to those features and that it includes within its scope each of the parts of the soil cultivating implement of cultivator that has been described, and/or that is illustrated in the accompanying drawings, both individually and in various combinations.

What we claim is:

1. A soil cultivating and material delivery implement comprising a frame and cultivator rotor means mounted on said frame, driving means connnected to rotate said rotor means about a substantially horizontal axis, a hood pivoted to said implement and said hood extending rearwardly and down towards the ground, the lower portion of said hood being a configured guide member that furrows the ground worked by said rotor means, material delivery means comprising a hopper positioned above said guide member and a plurality of ducts extending downwardly to delivery openings located adjacent lower extensions of said guide member said ducts being supported on said hood, a ground engaging levelling member being adjustably secured to side plates of said hood and a front surface of said levelling member being located to the rear, adjacent said openings to protect same from clogging by soil.

2. An implement as claimed in claim 1, wherein rollers are successively arranged behind said levelling member.

3. An implement as claimed in claim 1, wherein a scraper is located immediately in advance of said guide member with respect to the direction of normal implement travel.

4. An implement as claimed in claim 3, wherein said scraper is a beam of angular cross-section arranged with limbs diverging downwardly from a junction of those limbs.

5. An implement as claimed in claim 3, wherein the lower ends of said ducts are located substantially above the lower ends of said extensions, 6. A soil cultivating and material delivery implement comprising a frame, power driven cultivator rotor means mounted on said frame and material delivery means, including a plurality of delivery members also mounted on said frame, said members communicating with a source of material to be applied to the ground worked by the rotor means and comprising ducts located at the rear of said rotor means with respect to the direction of travel, said ducts having lower ends with openings normally located above the ground, a hood connected to said frame and positioned adjacent the rotor means at the rear thereof, said hood extending rearwardly and down towards the ground, the lower part of said hood compising a guide member for material received from said openings and said guide member including extensions that are positioned to contact and furrow the worked ground, the lower ends of said ducts being supported on said hood adjacent the rear of said extensions to deposit material in furrows made by said extensions during the forward movement of the implement, ground engaging means to the rear of said lower ends being positioned to close the furrows.

7. An implement as claimed in claim 6, wherein each extension is inclined downwardly and rearwardly and positioned immediately in front of a corresponding lower end of a duct.

8. An implement as claimed in claim 6, wherein each extension is plate-like in formation and bent-over rearwardly with upwardly extending side parts.

9. An implement as claimed in claim 6, wherein said extensions are integral with another and comprise a row of teeth formed in the lower edge of said guide member.

10. An implement as claimed in claim 6, wherein said ground engaging means comprises a screening member connected to the hood and arranged behind said guide member, the openings of said lower ends being protected from clogging with soil by said ground engaging screening member.

11. An implement as claimed in claim 10, wherein said screening member extends across substantially the entire working width of said guide member and has a front side which is inclined upwardly and forwardly.

12. An implement as claimed in claim 10, wherein said screening member extends substantially parallel to said guide member and is connected to said hood with adjusting means, said screening member being settable in any one of a plurality of positions at different levels relative to said guide member.

13. An implement as claimed in claim 12, wherein said adjusting means interconnects the screening member to sides of the hood and said screening member has a lower, ground engaging portion of substantially cylindrical curvature.

14. A combination as claimed in claim 13 wherein the sides of said hood comprise vertical plates and said screening member has further plates that are adjustably connected to said vertical plates, said vertical plates having slots that extend substantially parallel to said guide member and fastening means in said slots interconnecting the further plates in any one of said positions.

15. An implement as claimed in claim 6, wherein said screening member is connected to said hood and extends across the working width of said guide member, said screening member having a front side which is inclined upwardly and forwardly, with respect to the direction of implement travel.

16. An implement as claimed in claim 15, wherein said screening member extends substantially parallel to said guide member and is connected to said hood with adjusting means, said screening member being settable in any one of a plurality of positions relative to said guide member.

17. An implement as claimed in claim 16, wherein, said adjusting means interconnects the screening member to sides of the hood and can be adjusted in horizontal level relative to the remainder of the implement.

18. An implement as claimed in claim 6, wherein each extension extends beneath a corresponding opening and said extensions are arranged in a row that is transverse to the direction of travel.

19. An implement as claimed in claim 6, wherein said hood is pivotably connected to the frame and turnable about an axis located adjacent to the top of said hood.

20. An implement as claimed in claim 6, wherein said delivery means includes a hopper located above the guide member and a rotatable mechanism in said hopper, a ground engaging roller positioned to the rear of said screening member, driving means on said roller connected to rotate said mechanism during implement travel.

* * * * *